(12) United States Patent
Matsushita et al.

(10) Patent No.: US 11,643,357 B2
(45) Date of Patent: *May 9, 2023

(54) CHALCOGENIDE GLASS MATERIAL

(71) Applicant: NIPPON ELECTRIC GLASS CO., LTD., Otsu (JP)

(72) Inventors: Yoshimasa Matsushita, Otsu (JP); Fumio Sato, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/638,783

(22) PCT Filed: Aug. 22, 2018

(86) PCT No.: PCT/JP2018/031041
§ 371 (c)(1),
(2) Date: Feb. 13, 2020

(87) PCT Pub. No.: WO2019/054145
PCT Pub. Date: Mar. 21, 2019

(65) Prior Publication Data
US 2020/0189964 A1 Jun. 18, 2020

(30) Foreign Application Priority Data
Sep. 12, 2017 (JP) .............................. JP2017-174793

(51) Int. Cl.
| B32B 15/04 | (2006.01) |
| B32B 17/06 | (2006.01) |
| C03C 3/32  | (2006.01) |
| C03C 4/10  | (2006.01) |
| C03C 17/36 | (2006.01) |
| G02B 1/115 | (2015.01) |

(52) U.S. Cl.
CPC ............ C03C 3/321 (2013.01); C03C 4/10 (2013.01); C03C 17/3657 (2013.01); G02B 1/115 (2013.01)

(58) Field of Classification Search
CPC ....... C03C 3/321; C03C 4/10; C03C 17/3657; G02B 1/115
USPC .................................... 428/426, 432; 501/42
See application file for complete search history.

(56) References Cited

U.S. PATENT DOCUMENTS

| 4,730,896 A | 3/1988 | Katsuyama et al. |
| 6,452,698 B1* | 9/2002 | Vlcek .................. G03H 1/18 359/3 |
| 7,116,888 B1* | 10/2006 | Aitken .................... C03C 3/321 385/147 |
| 2010/0285946 A1* | 11/2010 | Tani .......................... C03C 4/10 501/40 |
| 2011/0244224 A1* | 10/2011 | Kurihara ................ G02B 1/115 428/432 |
| 2014/0124782 A1* | 5/2014 | Jung .................. H01L 31/02164 257/48 |
| 2016/0356926 A1 | 12/2016 | Takahashi et al. |
| 2017/0153141 A1* | 6/2017 | Sato ......................... G01J 1/04 |
| 2017/0160436 A1 | 6/2017 | Takahashi et al. |
| 2017/0192132 A1 | 7/2017 | Takahashi et al. |
| 2019/0023609 A1 | 1/2019 | Yamaguchi et al. |

FOREIGN PATENT DOCUMENTS

| CN | 106104311 A | 11/2016 |
| CN | 106796308 A | 5/2017 |
| CN | 106796309 A | 5/2017 |
| EP | 1 642 870 A1 | 4/2006 |
| JP | 59-088338 A | 5/1984 |
| JP | 60-114801 A | 6/1985 |
| JP | 61-127639 A | 6/1986 |
| JP | 01-230001 A | 9/1989 |
| JP | 08-15501 A | 1/1996 |
| JP | H0815501 * | 1/1996 |
| JP | 08-310840 A | 11/1996 |
| JP | 2001-264509 A | 9/2001 |
| JP | 2009-161374 A | 7/2009 |
| JP | 2011-221048 A | 11/2011 |
| JP | 2017-124952 A | 7/2017 |
| JP | 2017-137204 A | 8/2017 |
| WO | 2016/052079 A1 | 4/2016 |
| WO | 2016/052080 A1 | 4/2016 |
| WO | 2017/126394 A1 | 7/2017 |

OTHER PUBLICATIONS

JPH0815501, English machine translation, 1996.*
Official Communication issued in International Patent Application No. PCT/JP2018/031041, dated Nov. 6, 2018.
Official Communication issued in corresponding European Patent Application No. 18855694.8, dated May 6, 2021.
Official Communication issued in corresponding Japanese Patent Application No. 2017-174793, dated Jul. 1, 2022.
Official Communication issued in corresponding Japanese Patent Application No. 2017-174793, dated Feb. 28, 2022.
Official Communication issued in corresponding Chinese Patent Application No. 201880059175.6, dated Oct. 11, 2021.

* cited by examiner

*Primary Examiner* — Lauren R Colgan
(74) *Attorney, Agent, or Firm* — Keating and Bennett, LLP

(57) ABSTRACT

Provided is a chalcogenide glass material having excellent weather resistance and being suitable as an optical element for an infrared sensor. The chalcogenide glass material contains, in terms of % by mole, 20 to 99% Te and has an antireflection film formed thereon.

7 Claims, No Drawings

CHALCOGENIDE GLASS MATERIAL

TECHNICAL FIELD

The present invention relates to chalcogenide glass materials for use in infrared sensors, infrared cameras, and so on.

BACKGROUND ART

Vehicle-mounted night vision devices, security systems, and the like include infrared sensors for use to detect living bodies at night. To sense infrared rays with wavelengths of about 8 to 14 μm emitted from living bodies, such an infrared sensor is provided, in front of the sensor part, with an optical element, such as a filter or a lens, capable of transmitting infrared rays in the above wavelength range.

Examples of a material for the optical element as described above include Ge and ZnSe. These materials are crystalline bodies and therefore poor in processability, which makes them difficult to process into complicated shapes, such as an aspheric lens. For this reason, these materials have a problem of difficulty in mass production of the above optical element and also have a problem of difficulty in size reduction of the infrared sensor.

To cope with the above, chalcogenide glasses are proposed as vitreous materials that can transmit infrared rays with wavelengths of about 8 to 14 μm and be relatively easily processable (see, for example, Patent Literature 1).

CITATION LIST

Patent Literature

[PTL 1]
JP-A-2009-161374

SUMMARY OF INVENTION

Technical Problem

However, the glass described in Patent Literature 1 has an infrared transmittance significantly decreasing at a wavelength of 10 μm or more and, therefore, particularly the sensitivity to infrared rays emitted from living bodies is poor, so that an infrared sensor may not sufficiently function. Furthermore, the glass has low weather resistance and, therefore, has the problem that it alters to decrease the infrared transmittance.

The present invention has been made in view of the above situation and, therefore, has an object of providing a chalcogenide glass material having excellent weather resistance and being suitable as an optical element for an infrared sensor.

Solution to Problem

A chalcogenide glass material according to the present invention contains, in terms of % by mole, 20 to 99% Te and has an antireflection film formed thereon.

Since the chalcogenide glass material according to the present invention contains Te as an essential component, it has an excellent infrared transmittance. Furthermore, since an antireflection film is formed on the surface, the reflection of infrared light can be reduced, so that the infrared transmittance can be further increased. In addition, since an antireflection film is formed on the surface, this can suppress the reaction of the glass with moisture or oxygen in the air and the attendant alteration. Therefore, the chalcogenide glass material has excellent weather resistance.

The chalcogenide glass material according to the present invention preferably contains, in terms of % by mole, 40 to 95% Te.

The chalcogenide glass material according to the present invention preferably further contains, in terms of % by mole, 0 to 40% Ge.

The chalcogenide glass material according to the present invention preferably further contains, in terms of % by mole, 0 to 30% Ga.

In the chalcogenide glass material according to the present invention, the antireflection film preferably includes a low-refractive index layer and a high-refractive index layer stacked alternately one on top of another in a total of two or more layers.

In an optical element according to the present invention, the above-described chalcogenide glass material is used.

In an infrared sensor according to the present invention, the above-described optical element is used.

Advantageous Effects of Invention

The present invention enables provision of a chalcogenide glass material having excellent weather resistance and being suitable as an optical element for an infrared sensor.

DESCRIPTION OF EMBODIMENTS

A chalcogenide glass material according to the present invention has an antireflection film formed thereon. As described previously, when an antireflection film is formed on the surface, the infrared transmittance and weather resistance can be increased.

First, a description will be given of the antireflection film.

The antireflection film preferably includes low-refractive index layers and high-refractive index layers stacked alternately one on top of another in a total of two or more layers, or in 2 to 34 layers, or particularly in 4 to 12 layers. If the number of layers stacked is too small, the antireflection film is less likely to pass infrared light therethrough. On the other hand, if the number of layers stacked is too large, the number of steps required for film formation becomes large, which tends to incur a high cost. Note that no limitation is placed on the combination of low-refractive index layers and high-refractive index layers and it is sufficient that the refractive index of the high-refractive index layers is relatively higher than that of the low-refractive index layers.

The thickness per layer of the refractive index layers is preferably 0.01 to 10 μm, more preferably 0.02 to 5 μm, and particularly preferably 0.03 to 2 μm. If the thickness per layer is too small, the antireflection film is less likely to pass infrared light therethrough. On the other hand, if the thickness is too large, the stress applied to the interface between the antireflection film and the chalcogenide glass material becomes large, so that the adhesion of the film and the mechanical strength of the glass material are likely to decrease.

The preferred materials for the refractive index layers are metal oxides ($Y_2O_3$, $Al_2O_3$, SiO, $SiO_2$, MgO, TiO, $TiO_2$, $Ti_2O_3$, $CeO_2$, $Bi_2O_3$, and $HfO_2$), hydrogenated carbon, diamond-like carbon (DLC), Ge, Si, ZnS, ZnSe, $As_2S_3$, $As_2Se_3$, $PbF_2$, metal telluride, and metal fluoride. In order to further increase the weather resistance and mechanical strength, a metal oxide, hydrogenated carbon or diamond-like carbon is preferably disposed as an outermost layer. In order to increase the adhesion, a metal oxide is preferably disposed as an interlayer. The material for the refractive index layers may be a resin and, for example, an olefin resin can be used.

Next, a description will be given of the composition of the chalcogenide glass material according to the present invention. Note that, in the following description of the respective contents of components, "%" refers to "% by mole" unless otherwise specified.

The chalcogenide glass material according to the present invention contains Te as an essential component. Te, which is a chalcogen element, is a component that forms the glass network and increases the infrared transmittance. The content of Te is 20 to 99%, preferably 40 to 95%, more preferably 50 to 85%, still more preferably 60 to 85%, and particularly preferably 70 to 80%. If the content of Te is too small, vitrification becomes difficult and the infrared transmittance is likely to decrease. On the other hand, if the content of Te is too large, the thermal stability of the glass is likely to decrease and Te-based crystals are likely to precipitate. Se and S, which are other chalcogen elements, are less likely to increase the infrared transmittance than Te and more likely to shorten the infrared transmission limit wavelength than Te.

The chalcogenide glass material may contain, in addition to the above components, the following components.

Ge is a component that widens the vitrification range and increases the thermal stability of the glass, without decreasing the infrared transmittance. The content of Ge is preferably 0 to 40%, more preferably 1 to 35%, still more preferably 5 to 30%, yet still more preferably 7 to 25%, and particularly preferably 10 to 20%. If the content of Ge is too large, Ge-based crystals are likely to precipitate and the raw material cost tends to rise.

Ga is a component that widens the vitrification range and increases the thermal stability of the glass, without decreasing the infrared transmittance. The content of Ga is preferably 0 to 30%, more preferably 1 to 30%, still more preferably 3 to 25%, yet still more preferably 4 to 20%, and particularly preferably 5 to 15%. If the content of Ga is too large, Ga-based crystals are likely to precipitate and the raw material cost tends to rise.

Ag is a component that widens the vitrification range and increases the thermal stability of the glass. The content of Ag is preferably 0 to 20% and particularly preferably 1 to 10%. If the content of Ag is too large, vitrification becomes difficult.

Al is a component that widens the vitrification range and increases the thermal stability of the glass. The content of Al is preferably 0 to 20% and particularly preferably 0 to 10%. If the content of Al is too large, vitrification becomes difficult.

Sn is a component that widens the vitrification range and increases the thermal stability of the glass. The content of Sn is preferably 0 to 20% and particularly preferably 0 to 10%. If the content of Sn is too large, vitrification becomes difficult.

Next, a description will be given of a method for producing the chalcogenide glass material according to the present invention.

Raw materials are mixed to give the above glass composition, thus obtaining a raw material batch. Next, a quartz glass ampoule is evacuated with the application of heat, the raw material batch is then put into the quartz glass ampoule, and the quartz glass ampoule is sealed with an oxygen burner while being evacuated.

Elemental raw materials (for example, Te, Ge, and Ga) may be used as the raw materials or compound raw materials (for example, GeTe, $GeTe_2$, and $Ga_2Te_3$) may be used as the raw materials. Alternatively, these types of raw materials may be used in combination.

Next, the sealed quartz glass ampoule is raised in temperature to 650 to 1000° C. at a rate of 10 to 80° C./hour in a melting furnace and then held for six to twelve hours. During the holding time, the quartz glass ampoule is turned upside down as necessary to stir the melt.

Thereafter, the quartz glass ampoule is taken out of the melting furnace and rapidly cooled to room temperature, thus obtaining a glass base material.

Subsequently, the obtained glass base material is processed into a predetermined shape (such as a disc shape or a lenticular shape).

An antireflection film is formed on one or both surfaces of the glass base material processed in the predetermined shape, thus obtaining a chalcogenide glass material. Examples of the method for forming the antireflection film include vacuum deposition, ion plating, and sputtering.

Alternatively, after the antireflection film is formed on the glass base material, the glass base material may be processed into the predetermined shape. However, for the reason that the antireflection film is likely to peel off in the processing step, the antireflection film is preferably formed after the glass base material is processed into the predetermined shape, unless the circumstances are exceptional.

In the chalcogenide glass material according to the present invention, the average infrared transmittance at wavelengths of 8 to 14 μm when the thickness is 2 mm is preferably 80% or more, more preferably 85% or more, and particularly preferably 90% or more. If the average infrared transmittance is too low, the chalcogenide glass material may not sufficiently function when used for an infrared sensor.

Since the chalcogenide glass material according to the present invention has an excellent infrared transmittance and excellent weather resistance, it is suitable as a cover member for protecting a sensor part of an infrared sensor or an optical element, such as a lens for focusing infrared light on an infrared sensor part of the infrared sensor.

EXAMPLES

Hereinafter, the present invention will be described with reference to examples, but is not limited to the examples.

Tables 1 and 2 show Examples (samples Nos. 1 to 10) of the present invention and Comparative Examples (samples Nos. 11 and 12).

TABLE 1

|  |  | No. 1 | No. 2 | No. 3 | No. 4 | No. 5 | No. 6 |
|---|---|---|---|---|---|---|---|
| Glass composition | Ge | 15 | 15 | 15 | 10 | 15 | 10 |
| (% by mole) | Ga |  | 10 | 5 | 10 | 5 | 10 |
|  | Te | 85 | 75 | 80 | 80 | 75 | 75 |
|  | Ag |  |  |  |  | 5 | 5 |
|  | Sb |  |  |  |  |  |  |

TABLE 1-continued

|  |  | No. 1 | No. 2 | No. 3 | No. 4 | No. 5 | No. 6 |
|---|---|---|---|---|---|---|---|
|  | Sn |  |  |  |  |  |  |
|  | S |  |  |  |  |  |  |
| Antireflection film | 1st layer | ZnS 0.5 μm | ZnS 0.3 μm | Ge 0.05 μm | Ge 0.24 μm | Ge 0.31 μm | Ge 0.4 μm |
|  | 2nd layer | Ge 0.15 μm | Ge 0.15 μm | ZnS 1.5 μm | ZnS 0.44 μm | $YF_3$ 0.45 μm | DLC 0.4 μm |
|  | 3rd layer | $YF_3 + BaF_2$ 1.25 μm | ZnS 0.5 μm | $YF_3 + BaF_2$ 1.3 μm | Ge 0.14 μm | Ge 0.36 μm | Ge 0.35 μm |
|  | 4th layer | ZnS 0.15 μm | $YF_3$ 0.8 μm | ZnS 0.2 μm | ZnS 0.22 μm | $YF_3$ 0.99 μm | DLC 1.6 μm |
|  | 5th layer | $YF_3 + BaF_2$ 0.2 μm | ZnS 0.3 μm |  | Ge 0.14 μm | Ge 0.11 μm |  |
|  | 6th layer |  |  |  | ZnS 0.6 μm | $YF_3$ 0.22 μm |  |
|  | 7th layer |  |  |  | $YF_3$ 0.88 μm |  |  |
|  | 8th layer |  |  |  | ZnS 0.28 μm |  |  |
|  | 9th layer |  |  |  |  |  |  |
|  | 10th layer |  |  |  |  |  |  |
|  | 11th layer |  |  |  |  |  |  |
|  | 12th layer |  |  |  |  |  |  |
|  | 13th layer |  |  |  |  |  |  |
| Average infrared transmittance (%) |  | 98 | 98 | 98 | 97 | 99 | 97 |
| Average infrared transmittance after holding (%) |  | 98 | 98 | 98 | 97 | 99 | 97 |
| Weather resistance |  | Good | Good | Good | Good | Good | Good |

TABLE 2

|  |  | No. 7 | No. 8 | No. 9 | No. 10 | No. 11 | No. 12 |
|---|---|---|---|---|---|---|---|
| Glass composition (% by mole) | Ge | 15 | 10 | 4 | 38 | 15 | 5 |
|  | Ga | 10 | 15 | 3 | 20 |  |  |
|  | Te | 70 | 70 | 93 | 42 | 85 |  |
|  | Ag | 5 | 5 |  |  |  |  |
|  | Sb |  |  |  |  |  | 30 |
|  | Sn |  |  |  |  |  | 5 |
|  | S |  |  |  |  |  | 60 |
| Antireflection film | 1st layer | $TiO_2$ 0.1 μm | $Al_2O_3$ 0.03 μm | Ge 0.14 μm | $HfO_2$ 0.05 μm | None | Si 0.24 μm |
|  | 2nd layer | ZnS 3.4 μm | Ge 0.01 μm | ZnS 0.79 μm | Ge 0.79 μm |  | DLC 0.15 μm |
|  | 3rd layer | $YF_3$ 0.31 μm | ZnS 0.4 μm | Ge 0.14 μm | $HfO_2$ 0.05 μm |  | Si 7 μm |
|  | 4th layer | ZnS 0.61 μm | $CaF_2$ 0.74 μm | $CeF_3$ 1.66 μm | ZnS 0.63 μm |  | Ge 0.96 μm |
|  | 5th layer | $YF_3$ 1.67 μm |  | $CeO_2$ 0.10 μm | $HfO_2$ 0.05 μm |  | DLC 1.09 μm |
|  | 6th layer | ZnS 0.08 μm |  |  | ZnS 0.63 μm |  |  |
|  | 7th layer | $Y_2O_3$ 0.16 μm |  |  | $HfO_2$ 0.05 μm |  |  |
|  | 8th layer |  |  |  | $YF_3$ 0.55 μm |  |  |
|  | 9th layer |  |  |  | $HfO_2$ 0.05 μm |  |  |
|  | 10th layer |  |  |  | $YF_3$ 0.55 μm |  |  |
|  | 11th layer |  |  |  | $HfO_2$ 0.05 μm |  |  |
|  | 12th layer |  |  |  | $YF_3$ 0.55 μm |  |  |
|  | 13th layer |  |  |  | $HfO_2$ 0.05 μm |  |  |
| Average infrared transmittance (%) |  | 97 | 99 | 95 | 94 | 52 | 68 |
| Average infrared transmittance after holding (%) |  | 97 | 99 | 95 | 94 | 45 | 68 |
| Weather resistance |  | Good | Good | Good | Good | Poor | Good |

Raw materials were formulated to give each of the glass compositions shown in Tables 1 and 2, thus obtaining a raw material batch. Next, a quartz glass ampoule washed in pure water was evacuated with the application of heat, the raw material batch was then put into the quartz glass ampoule, and the quartz glass ampoule was sealed with an oxygen burner while being evacuated. The sealed quartz glass ampoule was raised in temperature to 650 to 1000° C. at a rate of 10 to 80° C./hour in a melting furnace and then held for six to twelve hours. During the holding time, the quartz glass ampoule was turned upside down every two hours to stir the melt. Thereafter, the quartz glass ampoule was taken out of the melting furnace and rapidly cooled to room temperature, thus obtaining a glass base material.

The obtained glass base material was processed, by cutting and polishing, into a disc shape with a diameter of 15 mm and a thickness of 2 mm and both the surfaces were then optically polished. An antireflection film having a structure shown in Tables 1 and 2 was formed by vacuum deposition on the whole surface of the glass base material after having been optically polished, thus obtaining a chalcogenide glass material. Regarding the antireflection film, as described in Tables 1 and 2, film formation was performed in the following order from the glass material side: the first layer, the second layer, the third layer, the fourth layer, the fifth layer, the sixth layer, the seventh layer, the eighth layer, the ninth layer, the tenth layer, the eleventh layer, the twelfth layer, and the thirteenth layer.

The obtained samples were measured or evaluated in terms of average infrared transmittance and weather resistance. The results are shown in Tables 1 and 2.

The average infrared transmittance at wavelengths of 8 to 14 μm was measured with an FT-IR (Fourier transform infrared spectro-photometer).

The weather resistance was evaluated in the following manner. The obtained sample was held at 60° C. and 90% RH in a thermo-hygrostat tank for 500 hours. The sample after the holding was measured in terms of average infrared transmittance at wavelengths of 8 to 14 μm with an FT-IR. The samples found to have no change between before and after the holding were indicated by a "Good" sign, whereas the sample found to have a change before and after the holding was indicated by a "Poor" sign.

As seen from Tables 1 and 2, the samples in Examples 1 to 10 exhibited an average infrared transmittance as high as 94% or more and excellent weather resistance. In contrast, Comparative Example 1 had no antireflection film formed thereon, for which reason its average infrared transmittance was as low as 52% and its weather resistance was poor. Comparative Example contained no Te, for which reason its average infrared transmittance was as low as 68%.

INDUSTRIAL APPLICABILITY

The chalcogenide glass material according to the present invention is suitable as a cover member for protecting a sensor part of an infrared sensor or an optical element, such as a lens for focusing infrared light on an infrared sensor part of the infrared sensor.

The invention claimed is:

1. A chalcogenide glass material consisting of:
   a glass base material, and
   an antireflection film formed directly on the glass base material, wherein
   the glass base material contains, in terms of % by mole, 20 to 99% Te, and
   the antireflection film includes a lower-refractive index layer and a higher-refractive index layer stacked alternately one on top of another in a total of two or more layers, the higher-refractive index layer having a higher refractive index than that of the lower-refractive index layer,
   a material of an outermost layer of the antireflection film, and thus also the outermost layer of the chalcogenide glass material, is at least one material selected from the group consisting of a metal oxide, hydrogenated carbon, diamond-like carbon, and ZnS, and
   a material of a first layer of the antireflection film on a side facing the glass base material chalcogenide glass material is at least one material selected from the group consisting of ZnS, Ge, Si, $Y_2O_3$, $TiO_2$, and $HfO_2$.

2. The chalcogenide glass material according to claim 1, wherein the glass base material contains, in terms of % by mole, 40 to 95% Te.

3. The chalcogenide glass material according to claim 1, wherein the glass base material further contains, in terms of % by mole, 0 to 40% Ge.

4. The chalcogenide glass material according to claim 1, wherein the glass base material further contains, in terms of % by mole, 0 to 30% Ga.

5. The chalcogenide glass material according to claim 1, wherein the material of the outermost layer of the antireflection film is the metal oxide, and the metal oxide is at least one material selected from the group consisting of $Y_2O_3$, $Al_2O_3$, SiO, $SiO_2$, MgO, TiO, $TiO_2$, $Ti_2O_3$, $CeO_2$, $Bi_2O_3$, and $HfO_2$.

6. An optical element in which the chalcogenide glass material according to claim 1 is used.

7. An infrared sensor in which the optical element according to claim 6 is used.

* * * * *